(12) United States Patent
Springer (10) Patent No.: US 7,773,501 B2
(45) Date of Patent: Aug. 10, 2010

(54) LABEL ASSIGNMENT ALGORITHM WITH RECEIVE-SIDE PROCESSING IMPLEMENTATION

(75) Inventor: Gary M. Springer, Alpharetta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 893 days.

(21) Appl. No.: 11/538,449

(22) Filed: Oct. 4, 2006

(65) Prior Publication Data

US 2008/0084863 A1 Apr. 10, 2008

(51) Int. Cl.
*G01R 31/08* (2006.01)

(52) U.S. Cl. .................. 370/222; 370/389; 370/474; 370/401

(58) Field of Classification Search ............ None
See application file for complete search history.

(56) References Cited

U.S. PATENT DOCUMENTS

| | | | | |
|---|---|---|---|---|
| 6,992,975 B1 * | 1/2006 | Daniel et al. | ............. | 370/222 |
| 7,054,277 B1 * | 5/2006 | Lau et al. | ............. | 370/256 |
| 7,324,440 B2 * | 1/2008 | Takagi et al. | ............. | 370/222 |
| 2003/0147345 A1 * | 8/2003 | Takagi et al. | ............. | 370/222 |
| 2005/0243823 A1 * | 11/2005 | Griswold et al. | ............. | 370/389 |
| 2009/0022168 A1 * | 1/2009 | Sakauchi et al. | ............. | 370/406 |
| 2009/0052317 A1 * | 2/2009 | Takagi et al. | ............. | 370/223 |

FOREIGN PATENT DOCUMENTS

| | | |
|---|---|---|
| EP | 1 796 318 | 6/2007 |
| WO | WO 2005/018145 | 2/2005 |
| WO | WO 2006/034613 | 4/2006 |

* cited by examiner

*Primary Examiner*—Bob A Phunkulh
(74) *Attorney, Agent, or Firm*—Tarolli, Sundheim, Covell & Tummino LLP (57) ABSTRACT

The present invention is directed towards systems and methods of routing payload data in a communications system. Specifically, the payload data is routed using a source address. The destination node(s) utilize a dynamically-stored look-up table indicating the source address when the payload data is to be dropped at that node(s).

4 Claims, 9 Drawing Sheets

FIG. 1
Prior Art

| Destination Node Address | 03 |
| Label Management Field | 007 01 |
| TTL | |
| HEC | |
| Payload Data | |

FIG. 9 ial content of the packet data is not critical to the present invention.

LABEL ASSIGNMENT ALGORITHM WITH RECEIVE-SIDE PROCESSING IMPLEMENTATION

FIELD OF THE INVENTION

This invention relates generally to broadband communications systems, such as cable television networks, and more specifically to an optical fiber ring that is suitable for use in the broadband communications system.

BACKGROUND OF THE INVENTION

Typically data packets are routed around a ring architecture using a transport protocol, such as Ethernet, multi protocol labeling system (MPLS), or resilient packet ring (RPR). Several of these transmission network protocols (e.g., RPR, MPLS) use labels that are identified in a label management field included in a header in a known manner. The label field tags, identifies, and addresses the data and routes the data through the system to its ultimate destination or destinations.

Figure 1:
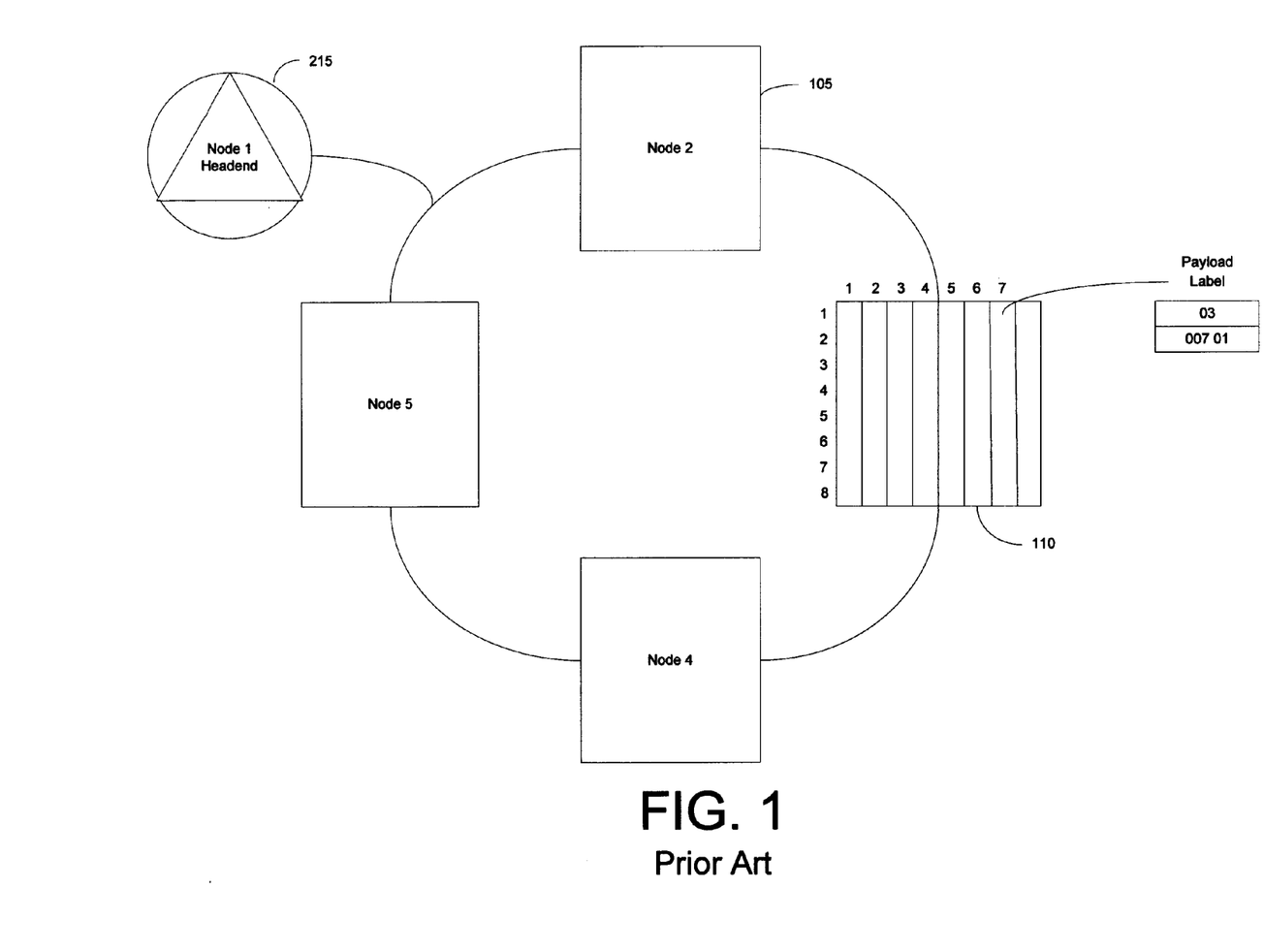
FIG. 1 illustrates a ring network including a source node that sends packet data to a destination node using the destination address.

FIG. 1 illustrates a ring network including a source node that sends packet data to a destination node using the destination address. For example, a source node 105 (i.e., node 2) delivers packet data to a destination, or receiving, node 110 (i.e., node 3). Conventionally, an administrator attaches the label, which identifies the intended destination address or addresses, to the packet data in a headend facility 215. In a known manner, an operator, using a provisioning computer, indicates the intended destination address in the label management field and attaches it to the packet data. This can be accomplished, for example, by using a "point and click" method. More specifically, an operator simply points and clicks at the source address and then points and clicks at the destination address that are shown on a screen. The packet data is subsequently routed around the ring to the intended node address. For redundancy, the packet data may be routed in two different directions, as indicated by the direction of the arrows around the ring, to the receiving node. The receiving node 110 then uses the label in the label management field to receive the packet data. The received data is processed and either dropped from the ring or retransmitted to another node. Prior to retransmission of the packet data, the receiving node must remap the label to the next destination address using a complicated algorithm.

Figure 2:
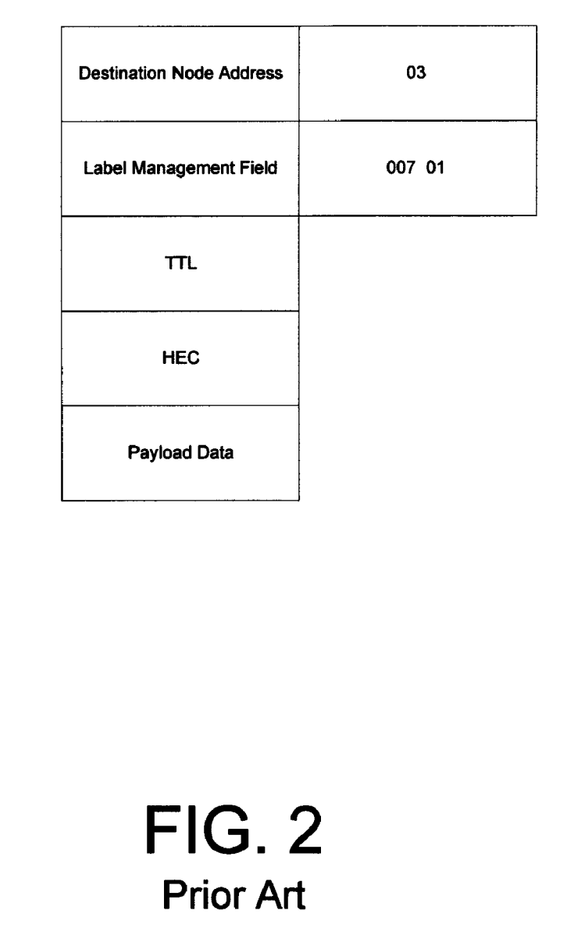
FIG. 2 illustrates an abridged version of the header information including the destination node address (e.g., node 03, card 0007, port 001) of FIG. 1 in the header label fields.

FIG. 2 illustrates an abridged version of the header information including the destination node address (node 03, card 0007, port 001) and the payload data. In this example, the data has been provisioned to indicate the destination address of FIG. 1. The destination node address may be indicated in the header information as a 48-bit MAC address or, alternatively, as a code address that is indicative of the 48-bit MAC address. The packet data is transported around the ring from the source node (i.e., node 2) to the destination node (i.e., node 3) at which point, node 3 recognizes the destination node address code. The label management field then specifies the particular card and port within the destination node address. For example, the packet data is intended for card 0007, port 001. The packet data is, therefore, dropped from further ring transport and delivered to coupled equipment that is attached to the stated card and port. Alternatively, the packet data may also be routed to an additional destination address. In this case, the first destination address is remapped in the first destination node, e.g., node 3, to indicate the next destination address. Also included in a typical header is time to live (TTL) data, which indicates the length of time the packet data continues before it is dropped from the ring transport, and a header error check (HEC), to name a couple.

A difficulty with routing packet data by the destination address, however, lies in the creation and management of the labels. The label management field is shared among all member nodes (e.g., nodes 1-5 in FIG. 1) of the network and thus labels are unique based on the destination address and, therefore, cannot be reused. As a result, the provisioning computer manages the label management field and assigns labels on demand. Generally, the destination address for delivery of the packet data in the label management field works well in a point-to-point routing network. Cable television systems, however, generally broadcast signals from point-to-multipoint utilizing a similar ring network. For example, a headend facility broadcasts signals via a system as illustrated in FIG. 1 to a plurality of subscriber terminals. There are, therefore, a plurality of destination addresses requiring the same payload data. What is needed, therefore, is a more robust and lower-cost design that is capable of routing packet data to a plurality of destination addresses.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. For example, the present invention is not dependent upon the transport method used, such as Ethernet, RPR, or MPLS. Additionally, the payload data can include voice and audio signals using MPEG transport; data signals over IP; or voice signals using T1 or E1 frames, to name but a few. The present invention is described more fully hereinbelow.

The present invention is directed towards a label management algorithm to ensure proper delivery of data packets among customer equipment. The customer equipment can be connected using any network topology, such as point-to-point, ring, or multi-ring with virtual local area network (VLAN) switching, to name a few. Specifically, the present invention is directed towards routing the data packets according to a source address. This is in contrast to the conventional routing of data packets that uses a destination address(es). Accordingly, the source address is a unique source of delivery, and the data packets can, therefore, be delivered to a plurality of destination addresses without requiring complex label swapping at each destination address. The exemplary embodiment of the present invention uses an Ethernet framing protocol for the label management, but it is anticipated that other protocols may be used, such as RPR or MPLS.

Figure 3:
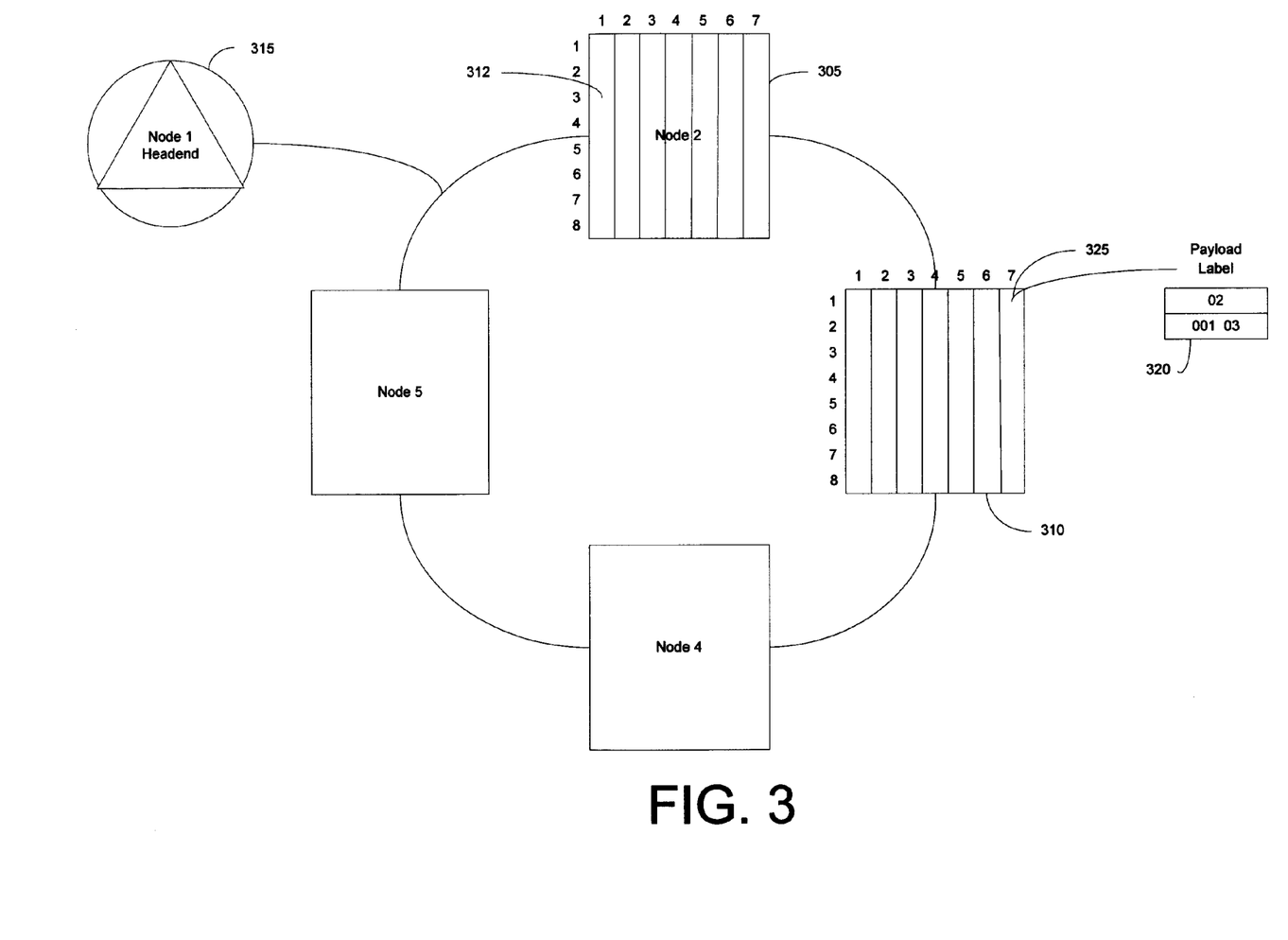
FIG. 3 illustrates a ring network including a source node that sends packet data to a destination node using the source address.

FIG. 3 illustrates a ring network including a source node 305 that sends packet data to a destination node 310 using the address of the source node 305. In this example, the source port 312 for the packet data has a source address 320 (node 02, card 001, port 03), and the destination port 325 in this illustration is node 03, card 007, port 01. It will be appreciated that the source and destination addresses of FIG. 3 are the same as illustrated in FIG. 1. The operator selects the source and the destination address (or destination addresses) at a provisioning computer located in, for example, a headend facility 315. In accordance with the present invention, the label field 320 designating the source node address 02, card 001, port 03, in this example, is attached in the header along with the payload data. As previously mentioned, the data can be routed around the ring in both directions for redundancy. Alternatively, the data can be sent in just one direction and, in the event of a fiber cut, the data can quickly be turned around and routed in the other direction in a known manner. Importantly, if the data is turned around, the source node 305 rejects the data and forwards the data to the destination node on its other side.

Figure 4:
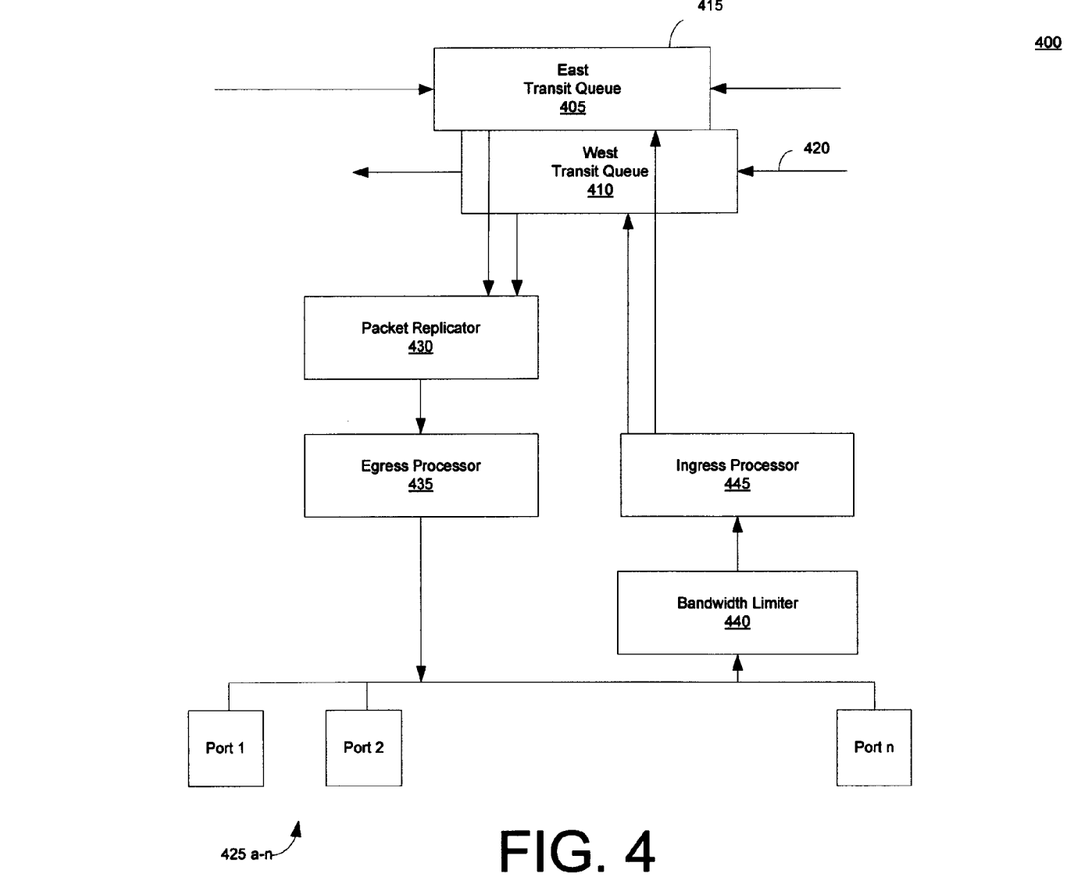
FIG. 4 is a block diagram of a node (e.g., a receiving and/or sending node) that receives and sends data by designating the source address in the label information in accordance with the present invention.

FIG. 4 is a block diagram of a node 400 that receives and/or sends data by designating the source address in the label information in accordance with the present invention. The node 400 interfaces with network fibers 415, 420 to receive and transmit data in opposite directions. A plurality of access ports 425a-n transmits and receives the payload data packets. In this manner, a single node 400 can serve multiple customers. For example, multiple tenants in an office or apartment complex can be coupled to a port 425. It will be appreciated that the customer equipment can be coupled to the access ports 425a-n via, for example, an Ethernet connection or wireless connection. Additionally, the node 400 is provisioned on a port bases; therefore, a different class-of-service (COS) can be assigned to different ports that provide multiple levels of service. For example, voice-over-IP (Internet protocol) may be categorized with a high priority port, and Internet access may be categorized with a lower priority port. The ports may be any combination of fast Ethernet ports, T1 ports or GbE ports, depending upon the customer's requirements.

Figure 5:
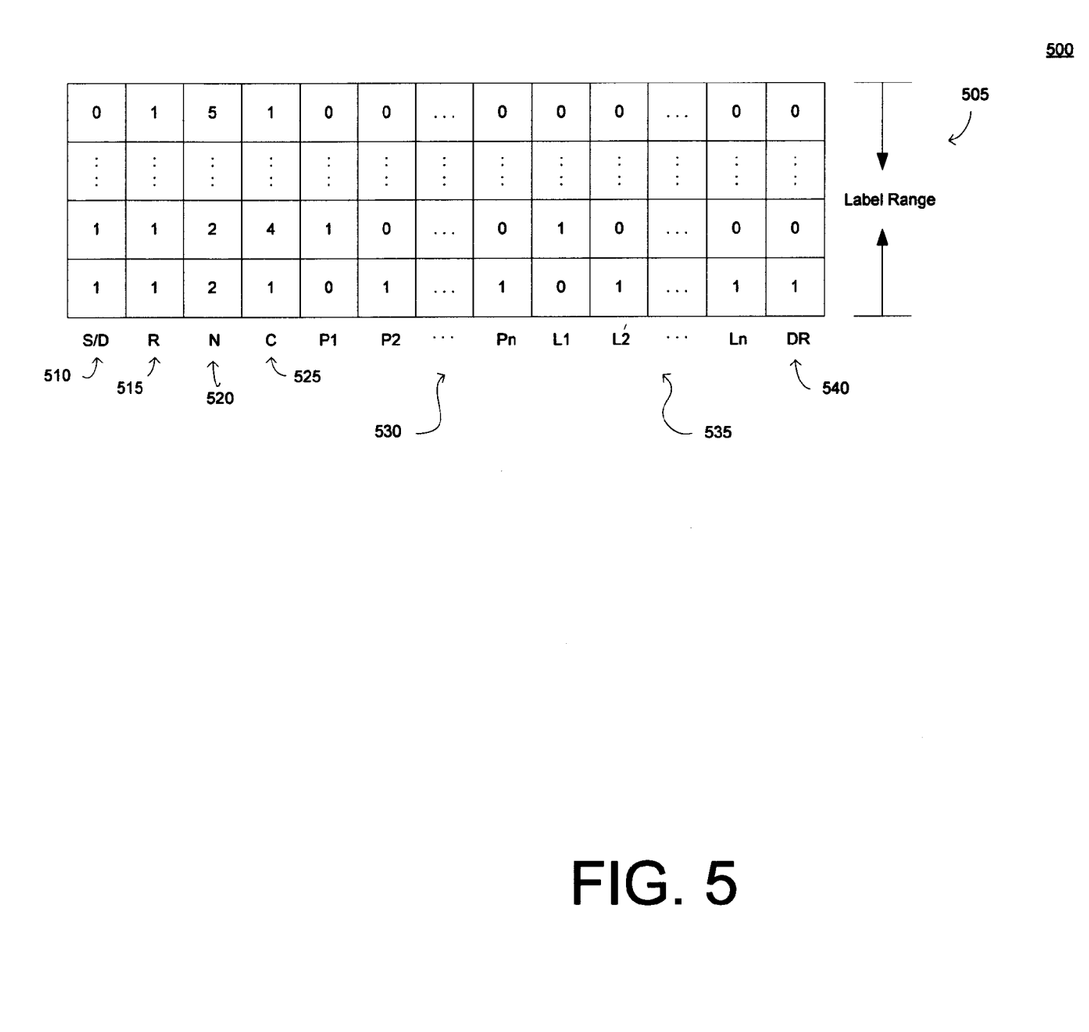
FIG. 5 illustrates an example of an abridged look-up table in accordance with the present invention that is suitable for use in the node of FIG. 4.

The node receives payload data packets from the ring into a transit queue 405, 410 depending upon the ring direction, and the packets are subsequently buffered. The label is extracted from the header information and compared against a look-up table that is included in the node 400 for processing instruction. FIG. 5 illustrates an example of an abridged look-up table 500 in accordance with the present invention that is suitable for use in the node of FIG. 4. The label range 505 includes a range of addresses indicating the routing of the data packets depending upon the address in the label header. A source/destination field 510 designates whether the address designates a source address or a destination address. For example, when the bit flag is set to "1," the address indicates a source address, and when the bit flag is set to "0," the address indicates a destination address. A destination address is used for a specific circumstance and is discussed below. In a network with multiple rings, the ring field 515 indicates a ring number (e.g., ring number 1-5) on which the source node is connected. The source node field 520 and card field 525 indicate the number of the source node (e.g., node 02) and the number of the card (e.g., card 001) where the data originates.

Physical output port field 530 and logical output port field 535 designate the address of the access port(s) 425a-n (FIG. 4). When a drop-to-port bit flag is set to "1," the packet is dropped to the corresponding access port 425(a-n) for egress. The physical port field 530 references the access ports 425a-n directly. By way of example, there may be eight physical ports included in the node 400 and subsequently there would be eight physical port fields. Simple port-to-port and port-to-multiport connections are accomplished by provisioning of the physical ports. More complex operations are supported through the logical port field 535. The logical port field 535 provides the capability of processing the packets in multiple ways that are output through a single physical port. For example, packets input to a single physical port can be mapped to separate logical ports based on a VLAN tag. Different VLAN tags can be applied to packets using the logical output port field 535 for transmitting data packets in a multi-ring network with VLAN switching. After processing the packet data according to the data structures defined for the logical port, the data is output through the physical port that is associated with the logical port. Separate provision is maintained for each port (i.e., the physical port and the logical port).

Referring again to FIG. 4, a packet replicator 430 is coupled to the transit queues 405, 410. Since data packets can be destined to multiple access ports 425a-n, the packet replicator 430 may replicate the data packets. An egress processor 435 then processes and provisions the replicated packets to the intended access port(s) 425a-n. It will be appreciated that the provisioning for the egress processor 435 is maintained in a non-volatile form. Additionally, separate provisioning data structures are maintained in the processor 435 for each access port 425a-n. The provisioned access port 425a-n then provides the data packets to the coupled customer equipment.

The access ports 425a-n may also receive data packets from the coupled computer equipment. A bandwidth limiter 440 provides a mechanism to enforce a provisioned bandwidth limit. An ingress processor 445 then receives the data packets and attaches an MPLS shim, which comprises the source/destination field 510 and the source node and card address, to the data packets. The data packets are then placed into one of, for example, four transit queues for ingress to the ring network depending upon the service class. For example, the classes may comprise time division multiplex (TDM), express forwarding (EF), assured forwarding (AF1), and best effort (BE). The data is then transmitted to the ring depending upon the service class.

Additionally, data packets received on the receive side of the node 400 are also provided to the transmit side of the node 400 for further transmission around the ring. In other words, the node 400 buffers the data packets and determines whether or not to continue routing the data around the ring if there are more than one intended destination. Referring again to FIG. 5, when the bit flag in the drop-from-ring field 540 is "0," the buffered data packets are inserted into the proper service class queue. The packets including the packets received by the access ports 425*a-n* are extracted from the transit queues 405, 410 and applied to the ring in service class order. The packets for one service class are not applied to the ring until all higher priority service class queues are exhausted.

Figure 6:
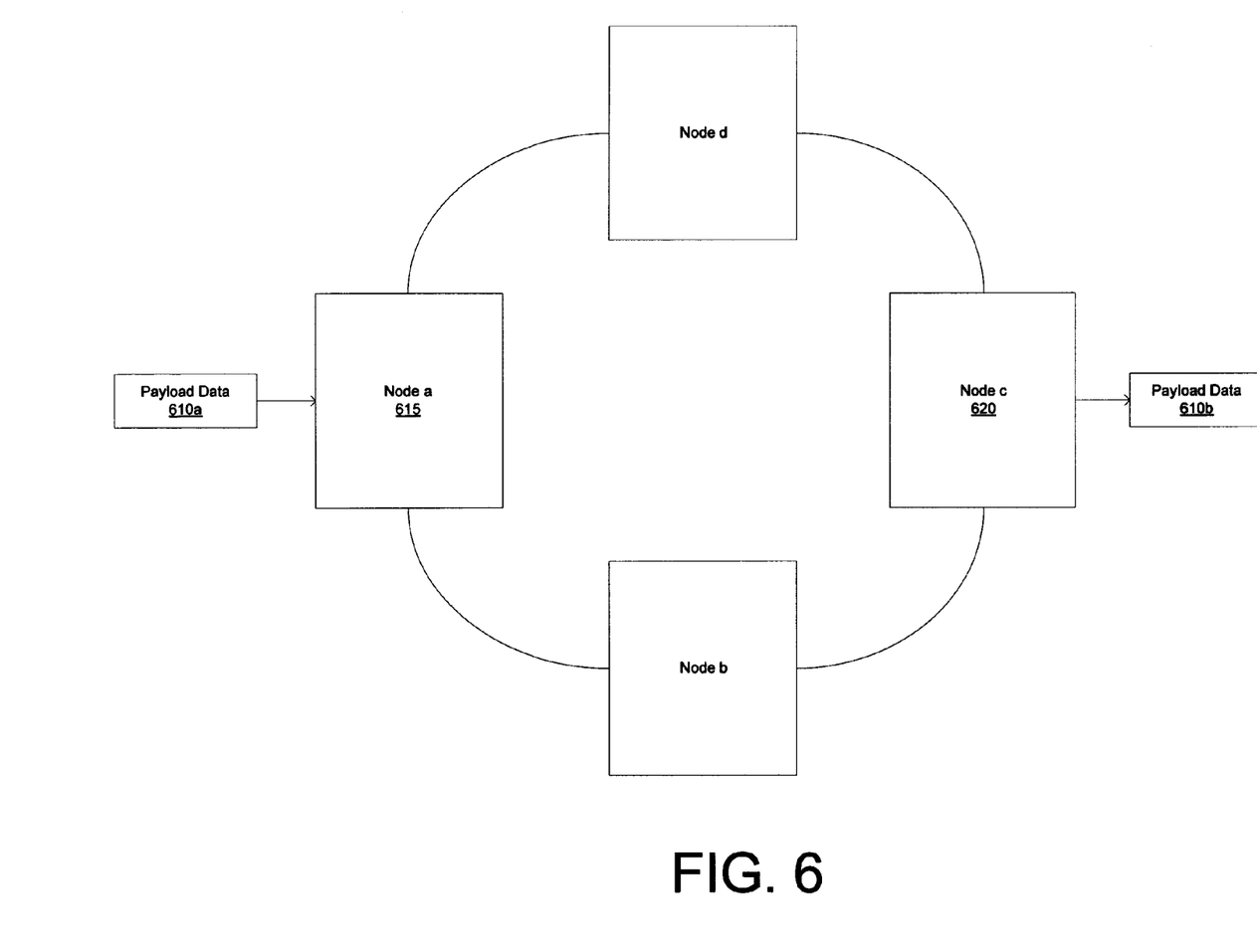
FIG. 6 illustrates a point-to-point application in which data is transported from one port to another port on the ring in accordance with the present invention.

FIG. 6 illustrates a point-to-point application in which data is transported from one port to another port on the ring in accordance with the present invention. Payload data 610*a*, which includes an added label including the source address, is added to the ring via an access port (not shown) in node 615. An entry indicating the source address is inserted into the label look-up table (FIG. 5) in the destination node(s) that allows for proper payload routing. Depending upon the operator's routing preference, the payload data 610*a* is routed in either direction or both directions around the ring. Using the inserted label and the look-up table, the destination node 620 removes the label and subsequently drops the payload 610*b* at the intended port.

Figure 7:
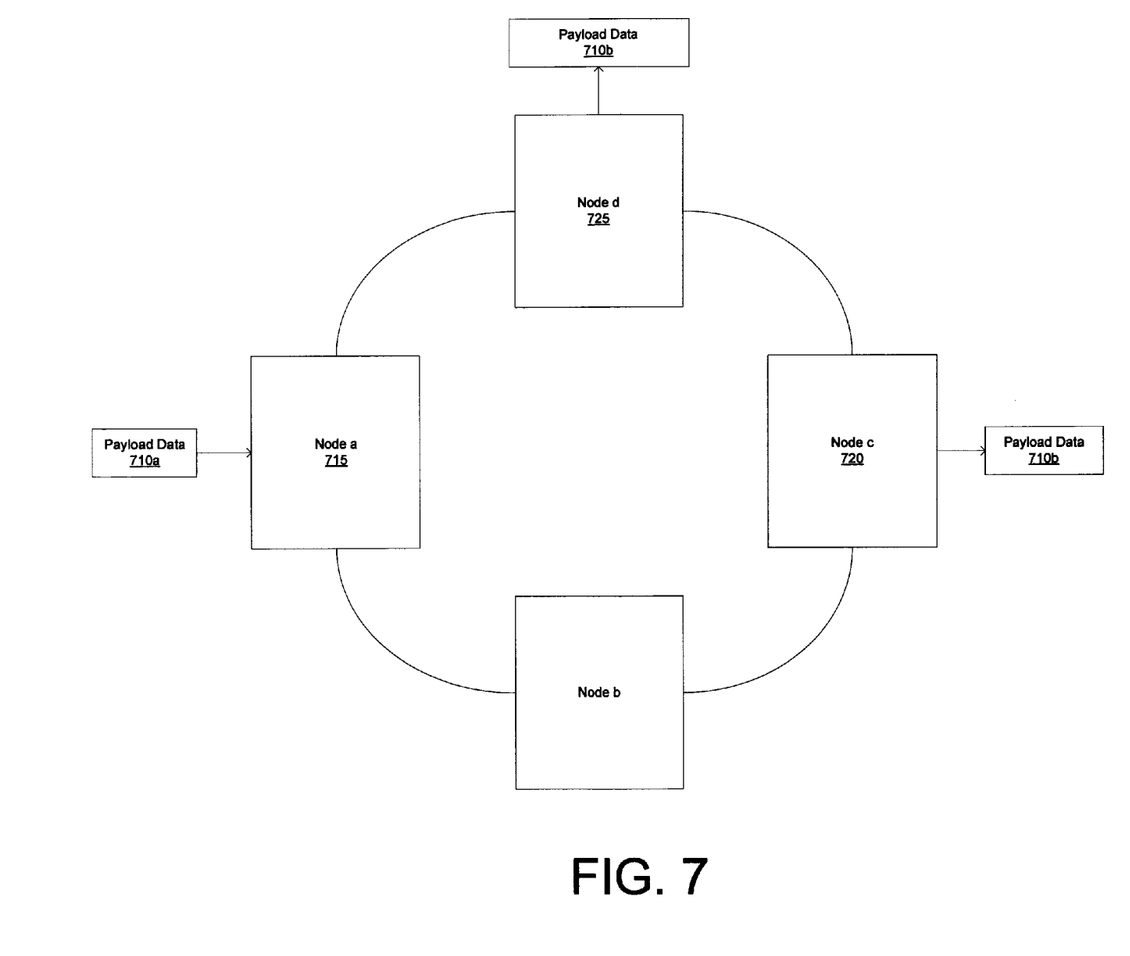
FIG. 7 illustrates a point-to-multipoint application in which data is transported from one port to multiports on the ring in accordance with the present invention.

FIG. 7 illustrates a point-to-multipoint application in which data is transported from one port to multiple ports on the ring in accordance with the present invention. Payload data 710*a*, which includes an added label including the source address, is added to the ring via an access port in node 715. An entry is inserted into the label look-up table at each intended destination node, which causes the payload to be dropped at both of the intended nodes and ports. The destination nodes 720, 725 each remove the source label and drop the payload 710*b* at the intended port.

Figure 8:
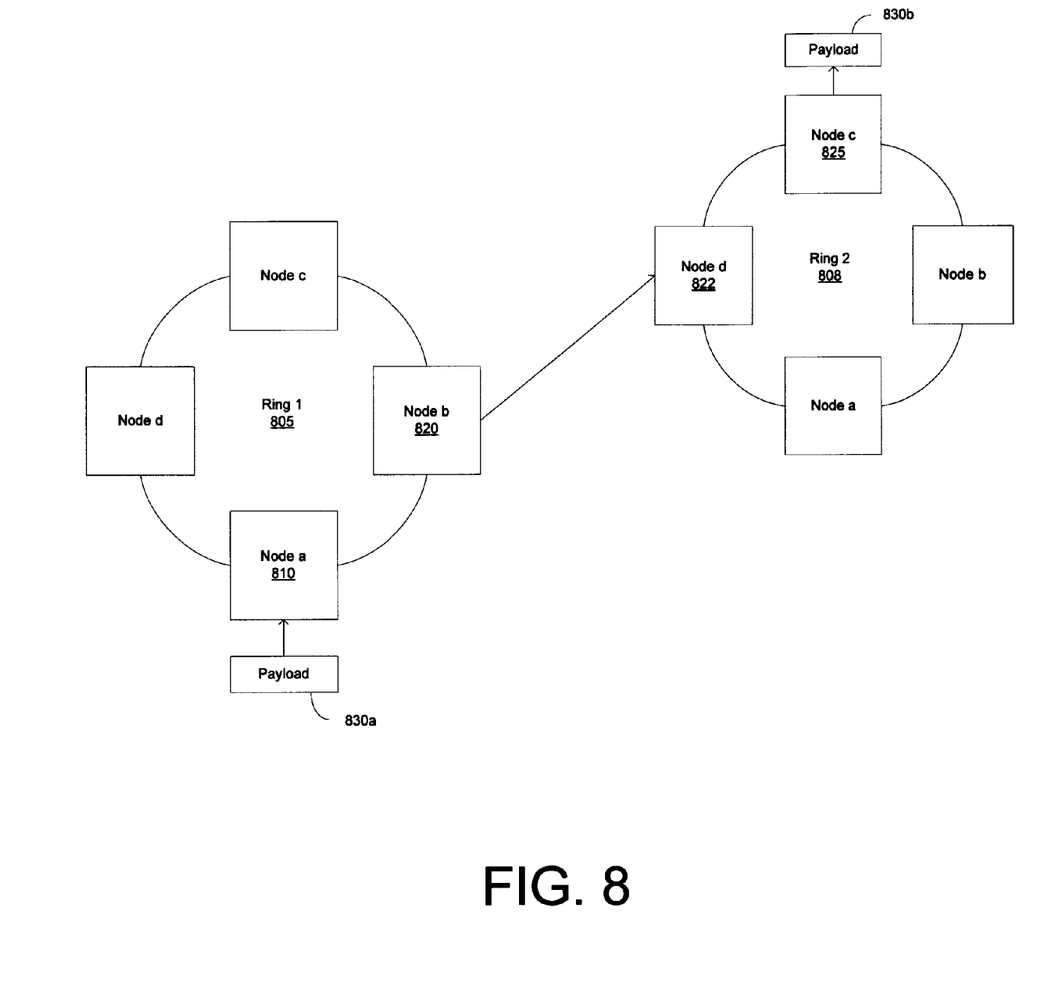
FIG. 8 illustrates a multi-ring configuration in which data is transported from one ring to another ring in accordance with the present invention.

FIG. 8 illustrates a multi-ring configuration in which data is transported from one ring to another ring in accordance with the present invention. Similar to the single ring application, an access port on a node in one ring 805 transmits a payload 830*a* intended for an access port on a node on a second ring 808 using the source address node 810, where the ring field 515 (FIG. 5) in the label look-up table also includes the source ring. At a connecting node 820, the access ports are provisioned differently than the single ring application, however. In the multi-ring configuration, the label is not removed, but rather retained for transmission around the second ring 808. Additionally, at an ingress node 822 of a second ring 808, the access ports are not provisioned to insert a label since the source label on the payload 830*a* is present. At the destination node 825, the label is then removed from the payload 830*b* prior to delivery to one of the access ports.

Figure 9:
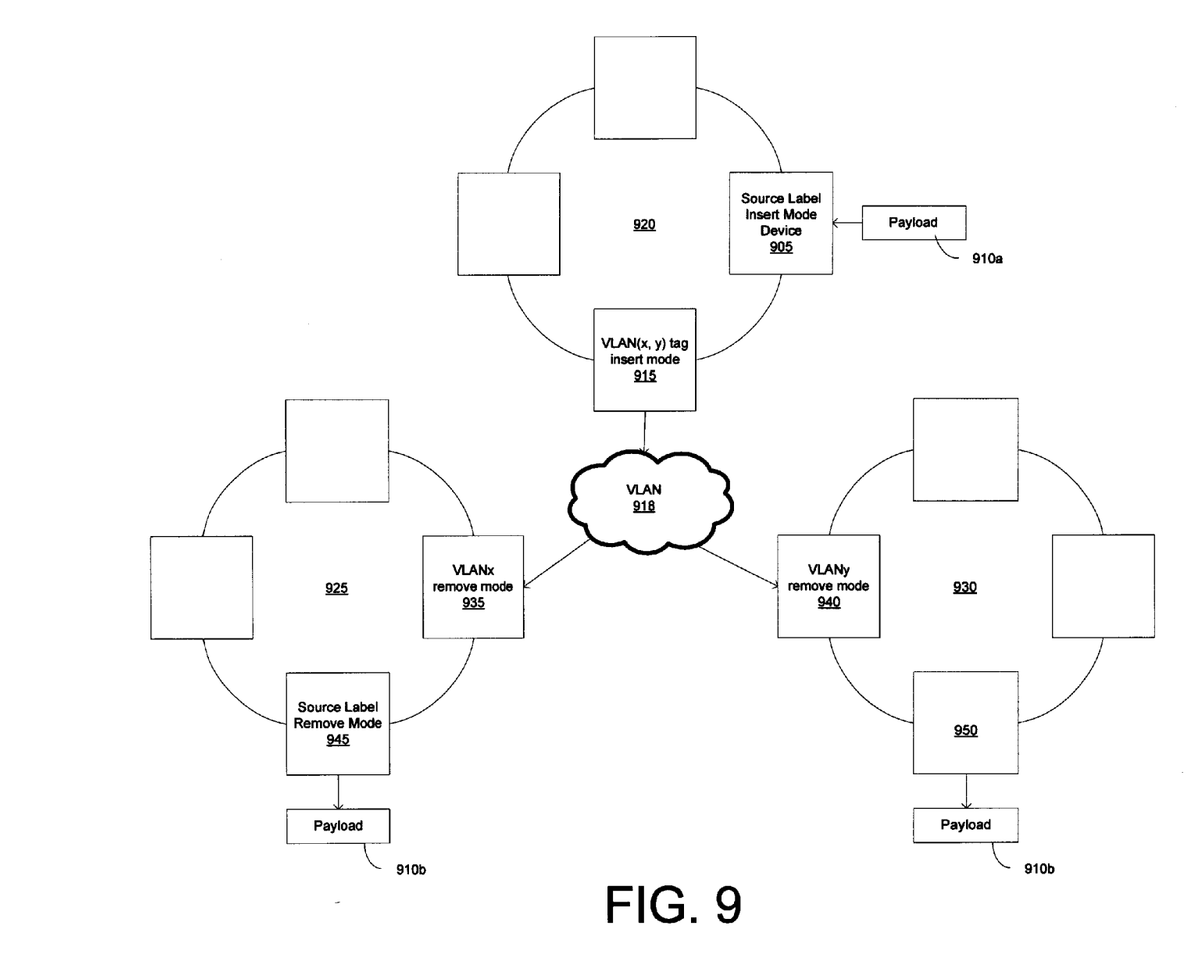
FIG. 9 illustrates a multi-ring configuration with VLAN switching in which data is transported from one ring to multiple destinations in accordance with the present invention.

FIG. 9 illustrates a multi-ring configuration with virtual local area network (VLAN) switching in which data is transported from one ring to multiple destinations in other rings in accordance with the present invention. In this application, node 905 inserts its source label to payload data 910*a*. The payload data 910*a* is routed around the ring 920 to node 915, which is the connecting node to a VLAN 918. An access port on the node 915 inserts a VLAN tag to payload 910*a* that selects one of multiple destinations (e.g., ring 925). If the payload data 910*a* is intended for multiple rings, an appropriate access port on the node 915 inserts a second VLAN tag for the second ring (e.g., ring 930). At the connecting nodes 935, 940 on the distant side of the VLAN 918, the ingress access ports strip the VLAN tag from the payload data. The payload data is then routed around the respective rings to the intended destination node 945, 950 using the source address. The egress access port of the destination node 945, 950 then strips the source label to provide payload data 910*b*.

The Detailed Description of a Preferred Embodiment set forth above is to be regarded as exemplary and not restrictive, and the breadth of the invention disclosed herein is to be determined from the claims as interpreted with the full breadth permitted by the patent laws.

What is claimed is:

1. A communications system for routing data throughout multiple rings, the communications system comprising:

a source node having a source address and a source ring, the source node for routing payload data including the source address and the source ring along with a VLAN tag;

a first destination node on a destination ring, wherein the VLAN tag is associated with the destination ring, the first destination node for receiving the payload data, wherein the first destination node receives the payload data based on the source address, the source ring, and the VLAN tag;

a connecting node on the source ring for inserting the VLAN tag;

an ingress connecting node on the destination ring, the ingress connecting node for stripping the VLAN tag from the payload data, and for routing the payload data, the source address, and the source ring; and an egress port on the first destination node for stripping the source address and the source ring from the payload data, and for providing the payload data to a connected device.

2. The communications system of claim 1, wherein the connecting node replicates the payload data, the source address, and the source ring and provides a second VLAN tag for routing to a second destination node.

3. The communications system of claim 1, wherein the first destination node comprises a table including fields specifying the source address and the source ring.

4. The communications system of claim 1, wherein the second destination node comprises a table including fields specifying the source address and the source ring.

* * * * *